United States Patent
Ansari (10) Patent No.: US 7,293,201 B2
(45) Date of Patent: Nov. 6, 2007

(54) SYSTEM AND METHOD FOR ACTIVE DIAGNOSIS AND SELF HEALING OF SOFTWARE SYSTEMS

(75) Inventor: Zubair Ansari, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 10/346,371

(22) Filed: Jan. 17, 2003

(65) Prior Publication Data

US 2004/0153823 A1 Aug. 5, 2004

(51) Int. Cl.
G06F 11/00 (2006.01)

(52) U.S. Cl. .............. 714/38; 714/25; 714/26; 714/27; 714/47; 714/48

(58) Field of Classification Search ........ 714/25, 714/26, 27, 38, 47, 48
See application file for complete search history.

(56) References Cited

U.S. PATENT DOCUMENTS

| | | | |
|---|---|---|---|
| 5,349,674 A * | 9/1994 | Calvert et al. .......... 709/227 |
| 6,282,712 B1 * | 8/2001 | Davis et al. ............ 717/170 |
| 6,321,348 B1 * | 11/2001 | Kobata .................. 714/37 |
| 6,425,093 B1 * | 7/2002 | Singh et al. ............ 714/38 |
| 6,742,141 B1 * | 5/2004 | Miller .................... 714/26 |
| 2004/0078686 A1 * | 4/2004 | Toyooka et al. ....... 714/38 |
| 2004/0236843 A1 * | 11/2004 | Wing et al. ............ 709/219 |

* cited by examiner

Primary Examiner—Robert Beausoliel
Assistant Examiner—Charles Ehne
(74) Attorney, Agent, or Firm—Shook, Hardy & Bacon, LLP (57) ABSTRACT

An active diagnostic and self healing system involves a support server configured to monitor the state of application and operating system software on a remote client, one or more of whose applications or OS has been registered to the automatic service of the invention. Software drivers or other patches, fixes or updates may be automatically transmitted to the client device via Internet or other connectivity upon the detection of an application or OS crash or other software fault. The user may select criteria according to which fixes and updates may be effected. The fixes and updates may be stored in a knowledge base, vendor databases or other resources, for instance available via Internet or other connections.

62 Claims, 4 Drawing Sheets

● AUTO UPDATE TO KNOWLEDGE BASE

○ ADD SOLUTION TO KNOWLEDGE BASE

○ APP 1     ENTER SOLUTION/CODE ▭

○ APP 2     ENTER SOLUTION/CODE ▭

⋮

○ RES 1     ENTER SOLUTION/CODE ▭

○ RES 2     ENTER SOLUTION/CODE ▭

⋮

○ RES Z

○ RETRIEVE DIAGNOSTIC PROFILE

ENTER CLIENT ID ▭

○ RUN ANALYTIC QUERY

○ TEST FOR CORRELATED FAULTS BETWEEN:

○ APP 1

○ APP 2

⋮

○ RES 1

○ RES 2

⋮

○ RES Z

○ OTHER

ADMINISTRATIVE INTERFACE

FIG. 4

SYSTEM AND METHOD FOR ACTIVE DIAGNOSIS AND SELF HEALING OF SOFTWARE SYSTEMS

FIELD OF THE INVENTION

The invention relates to the field of computing, and more particularly to platforms capable of remotely sensing and healing applications and other software installations.

BACKGROUND OF THE INVENTION

Software failures, faults and inconsistencies on both the application and operating system (OS) sides exact a price on computer users, network administrators and others. Applications may crash due to run-time errors, hardware updates and incompatibilities and other issues. An operating system may hang or fail to deliver expected services due to driver conflicts, conflicting updates, security breaches and other issues. In any case, a variety of types of software faults stress the user support systems of many software vendors. This may be particularly the case in larger or more complex network sites, such as sites utilizing enterprise server or other clusters. For these sites several hours of telephone consultation may be required to fix software faults encountered by users.

Some software applications have incorporated updating or healing features. Microsoft Corp.'s Office™ suite for instance is equipped with certain self-repair features, including an ability to detect the deletion of significant associated files which are then automatically reinstalled. The Microsoft WindowsXP™ operating system for its part may alert a user when OS updates become available, through Internet or other connectivity. However, the WindowsXP™ repair function is not entirely automatic, in that it does not retrieve necessary updates over the Internet or other connectivity directly. That operating system instead builds a directory of pending or possible patches which the user then manually chooses to install. A user moreover may not program the OS or application update service to filter out, automatically install or otherwise process software fixes according to flexible criteria. Other problems exist.

SUMMARY OF THE INVENTION

The invention overcoming these and other problems in the art relates in one regard to a system and method for active diagnosis and self healing of computer software systems, in which one or more software applications along with the operating system of a client or other computing device may be continuously monitored for current and prospective software errors, and be automatically subjected to software refreshes to be healed and updated without user intervention. In embodiments, the application suite as well as operating system of a client device may be registered to a remote server which monitors the client device for software faults and other anomalies. When an application or OS crash or other fault occurs, that event may be trapped and an inquiry made against a knowledge base or other resource to determine a potential fix. That solution may be automatically delivered to the malfunctioning client, or in cases the user may select between possible fixes or elect to uninstall problem software or take other remedial action. In embodiments, the user of a client device may adjust or program the triggering events and other conditions of the self healing facility, for example to exclude simple memory errors from attempted fixes, inhibit fixes until a certain number of repeated faults have occurred, or apply other criteria or conditions to the self correction action.

DETAILED DESCRIPTION OF EMBODIMENTS

Figure 1:
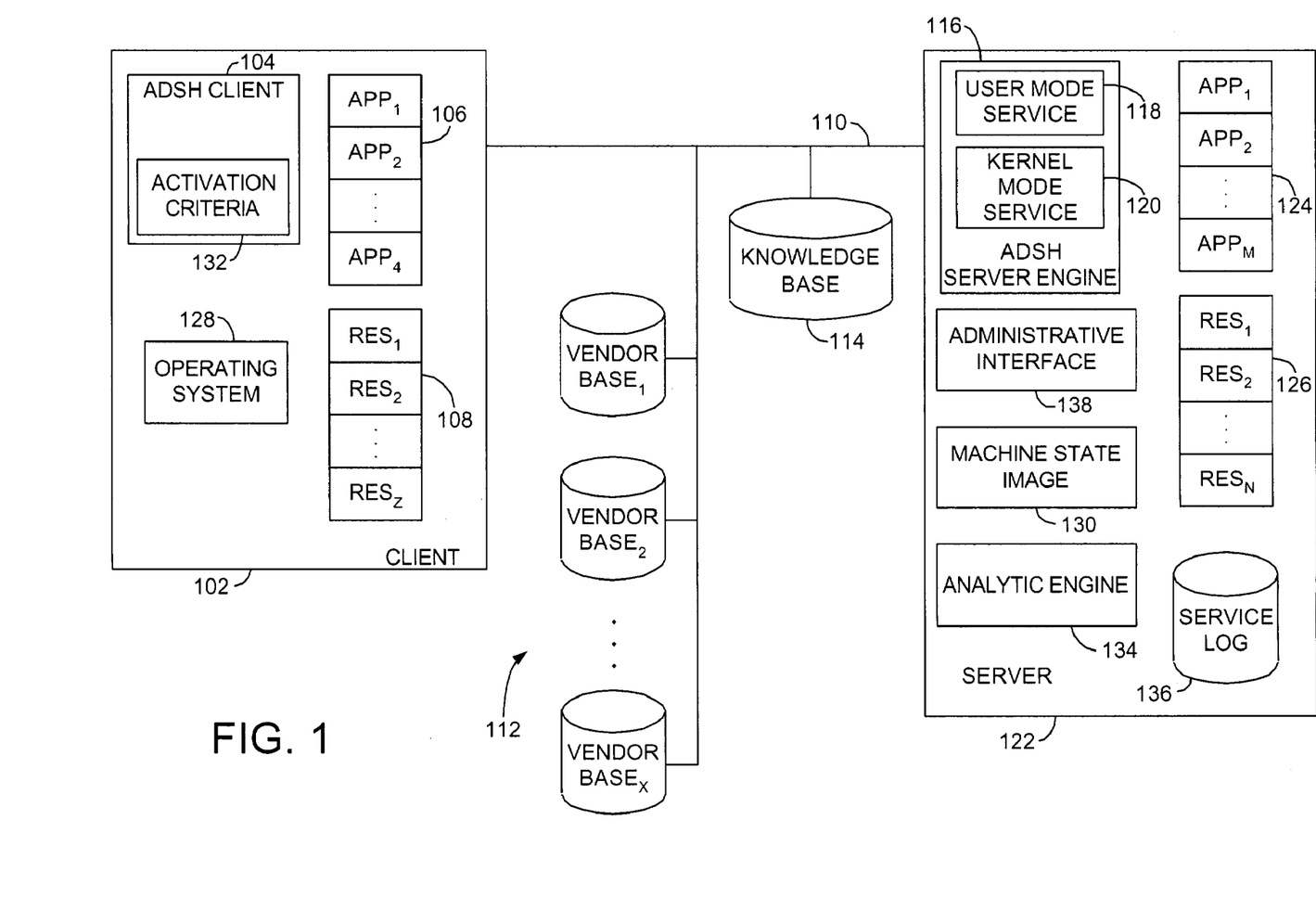
FIG. 1 illustrates a network architecture, in which an embodiment of the invention may operate.

FIG. 1 illustrates an architecture in which active diagnostic and self-healing technologies may operate, according to an embodiment of the invention. As illustrated, a user may operate a client 102, for instance run a client application set 106 containing one or more applications $APP_1$, $APP_2$ . . . $APP_Y$ (Y arbitrary). Individual applications in client application set 106 may be or include various productivity, utility, communications or other software, plugins or modules, such as for instance word processing, spreadsheet, database, Web browsing or other programs, suites or platforms.

Client 102 may be or include, for instance, a personal computer running an operating system 128. In embodiments, the operating system 128 may be or include the Microsoft Windows™ 95, 98, Millenium™, NT™, 2000 or XP™, Windows™CE™, MacOS™, PalmOS™, Unix, Linux, Solaris™, OS/2™, BeOS™, MacOS™, VAX VMS or other operating system or platform. Client 102 may include a microprocessor such as an Intel x86-based or Advanced Micro Devices x86-compatible device, a Motorola 68K or PowerPC™ device, a MIPS, Hewlett-Packard Precision™, or Digital Equipment Corp. Alpha™ RISC processor, a microcontroller or other general or special purpose device operating under programmed control. Client 102 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art.

In embodiments, the client 102 may be equipped with an integral or connectable cathode ray tube (CRT), liquid crystal display (LCD), electroluminescent display, light emitting diode (LED) or other display screen, panel or device for viewing and manipulating files, data and other resources, for instance using a graphical user interface (GUI) or command line interface (CLI). Client 102 may in embodiments also be or include a network-enabled appliance such as a WebTV™ unit, radio-enabled Palm™ Pilot or similar unit, a set-top box, a networkable game-playing console such as Microsoft Xbox™, Sony Playstation™, Sega Dreamcast™, a browser-equipped or other network-enabled cellular telephone, or other TCP/IP client or other device.

As illustrated, the client 102 may also contain or store a set of client resource set 108, containing one or more resources $RES_1$, $RES_2$ . . . $RES_Z$ (Z arbitrary). Individual resources may be or include, for example, hardware drivers such as video, audio, printer, storage device or other drivers, BIOS code or settings, or other code or resources supporting the operation of client 102 as a system.

In embodiments as illustrated, the client 102 may be connected to further resources, including an automatic diagnostic and self healing (ADSH) service 116. by way of communications link 110. Communications link 110 may be, include or interface to any one or more of, for instance, the Internet, the World Wide Web, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.92, V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Communications link 110 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11 (Wi-Fi)-based radio frequency link such as 802.11a, 802.11b, 802.11g or other protocol. Communications link 110 may yet further be, include or interface to any one or more of an RS-232 serial connection, an IEEE-1394 (Firewire) connection, a Fibre Channel connection, an iRDA (infrared) port, a SCSI (Small Computer Systems Interface) connection, a USB (Universal Serial Bus) connection or other wired or wireless, digital or analog interface or connection.

The ADSH server engine 116 may in embodiments include one or more processes to mediate the fault detection and healing action of the invention. As illustrated, ADSH server engine 116 may include a user mode service 118, which may be generally directed to application support, and a kernel mode service 120, which may be generally directed to operating system support. Other services or categorizations are possible. In embodiments, the ADSH service may reside or execute on a support server 122, or other dedicated host or other system. The ADSH server engine 116 may for instance communicate with the client 102 over communications link 110 using dedicated or dynamic transfer control protocol or other port assignments, or other communications channels or mechanisms. The support server 122 may be or include, for instance, a workstation running the Microsoft Windows™ NT™, Windows™ 2000, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

In embodiments, the client 102 may communicate with the ADSH server engine 116 to cooperatively monitor for software faults, failures and other conditions which may require remedial or other action. The client 102 may so communicate with the ADSH service on a continuous, periodic, triggered episodic or other basis, depending on network configuration and other factors. For instance, a user of client 102 may install an update to an application in the client application set 106. Upon launching that updated application, the client 102 may encounter a printing fault which prevents documents or files from printing to a printing device. The operating system 128 of client 102 may trap that print fault, and communicate a machine state image 130 of client 102 to the ADSH server engine 116.

The machine state image 130 may contain a snapshot of the state of one ore more of the subject application causing a fault, other software or components, hardware profiles including drivers, and other information representing processes and resources active at the time of the detected fault, or otherwise. In embodiments, the delivery of machine state image 130 may not necessarily be conditioned on the occurrence of a software or other fault, but instead may be performed periodically or otherwise as a maintenance or other measure.

Support server 122 may receive the machine state image 130 from client 102, and identify the source or sources of an existing execution fault. In embodiments, support server 122 may maintain an application support set 124 containing one or more individual applications $APP_1$, $APP_2$ ... $APP_M$ (M arbitrary). Application support set 124 may represent a library of applications which may be registered to the ADSH server engine 116 as eligible for maintenance and healing services, according to the invention. In embodiments, the application support set 124 may contain a variety of productivity, utility, communications or other applications, from one or more vendors or sources.

In embodiments, support server 122 may also maintain a resource support set 126 containing one or more individual resources $RES_1$, $RES_2$ ... $RES_N$ (N arbitrary). Resource support set 124 may represent a library of operating system or other system or other resources which may be registered to the ADSH server engine 116 as eligible for maintenance and healing services, according to the invention. In embodiments, the resource support set 126 may contain hardware drivers such as video, audio, printer, storage device or other peripheral or other drivers, BIOS code or settings, or other code or resources supporting the operation of clients registered to the ADSH server engine 116. In embodiments, the resource support set 126 may contain an indication whether a given individual resource is certified by the vendor of operating system 128 or otherwise for compatible operation, or contain other data regarding client resources.

Upon receipt of the machine state image 130, the ADSH server engine 116 may check the offending application or other process requiring diagnosis or attention against the application support set 124 and resource support set 126 to determine whether that application or process is valid and eligible for support according to the invention. If not, a message may be communicated to client 102 to indicate that automated diagnostic support is not available for the component causing the failure or other condition.

For applications, resources or other components which are validly registered to the ADSH server engine 116, the ADSH server engine 116 may identify the application, resource or other component necessitating a fix to determine possible software updates, patches or other healing or maintenance action. In embodiments, the ADSH server engine 116 may communicate with one or more knowledge base 114 to test for recorded instances of the particular type of fault or condition. ADSH server engine 116 may likewise communicate with knowledge base 114 via communications link 110, or in embodiments may communicate via dedicated or other direct or indirect channels. In embodiments, the registration and continued support of ADSH server engine 116 may be on a paid or unpaid subscription basis, or other bases.

For instance, in embodiments, if the ADSH server engine 116 determines that an update to a word processing application has caused an incompatibility with an existing printer driver loaded on client 102, the ADSH server engine 116 may perform a lookup in knowledge base 114 to determine a quick fix engineering (QFE) or other solution to the fault. In embodiments, the solution may involve the downloading, for example, of a more current printer driver or other resource, an update or patch to the application causing the crash or other fault or other condition, or other data from the knowledge base to the client 102.

In embodiments, the ADSH service may likewise communicate with a vendor base set 112 containing one or more vendor bases BASE1, BASE2 . . . BASE$_X$ (X arbitrary) which may be or include application, update, driver or other local or remote databases or resources for particular applications from particular vendors to extract fixes and solutions for a specific fault.

In embodiments, knowledge base 114, vendor base set 112 and other storage resources may be configured according to standard database schema standards, to enhance the compatibility and interoperability of the ADSH service. This may be helpful, for instance, when more than one ADSH server or other engine accesses knowledge base 114, vendor base set 112 or other storage resources. The content of knowledge base 114, vendor base set 112 and other storage resources may be indexed or numbered according to standard schema or specifications, to increase the efficiency of searches and other operations on the content of those resources. Schema in which knowledge base 114, vendor base set 112 and other storage resources may be configured include, for example, object-based models such as the ODMG standard (2.0 or other) promulgated by the Object Database Modeling Group, or other object-based or non-object based specifications. Object-based schema may permit binding to or through a variety of programming interfaces, such as XML, C++, Java and others. Knowledge base 114, vendor base set 112 and other storage resources may in embodiments be, include or interface to extensible or configurable database and other resources, such as standard query language (SQL) and other platforms.

Knowledge base 114, vendor base set 112 and other storage resources may likewise be, include or interface to, for example, the Oracle™ relational database sold commercially by Oracle Corp. Other databases or platforms, such as Informix™, DB2 (Database 2), Sybase™ or other data storage or query formats, platforms or resources such as OLAP (On Line Analytical Processing), a storage area network (SAN), Microsoft Access™ or others may also be used, incorporated or accessed in the invention. Knowledge base 114, vendor base set 112 and other storage resources may be supported by server or other resources, and may in embodiments include redundancy, such as a redundant array of independent disks (RAID), for data protection.

In embodiments, the machine state image 130 may reflect complex or multiple software conditions or faults, for which direct resolution through knowledge base 114 or other platforms may not be feasible. In such cases, the ADSH client 104 may present the user of client 102 with further alternatives, such as reverting to prior versions of applications, drivers or other resources, contacting a support line, or taking other action.

Figure 2:
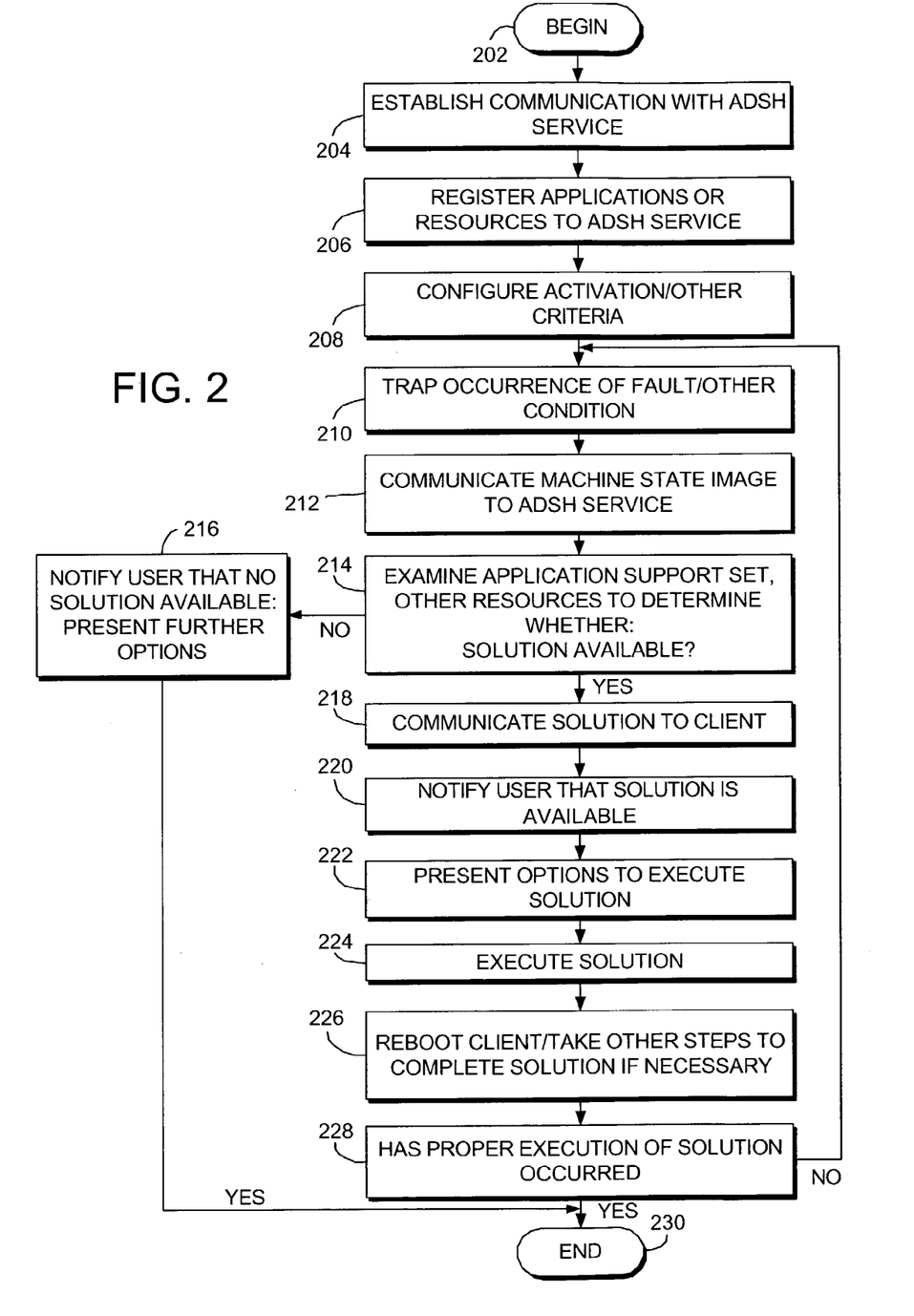
FIG. 2 illustrates a flow chart of diagnostic and healing processing, according to an embodiment of the invention.

Diagnostic and related processing according to an embodiment of the invention is illustrated in FIG. 2. In step 202, processing may begin. In step 204, client 102 may establish communications with ADSH server engine 116. In step 206, one or more individual applications in client application set 106 or client resource set 108 may be registered to ADSH server engine 116. In step 208, a user may operate the ADSH client 104 to select activation criteria 132 or otherwise program or configure desired diagnostic and self healing services, according to the invention.

In step 210, the client 102 may trap an occurrence of a software fault or other condition to report to ADSH server engine 116, for instance by isolating that fault or condition in the operating system 128. In embodiments, the trapping of a fault or other condition may include the generation of a machine state image 130, or recording other data. In step 212, a machine state image 130 or other data reflecting that fault or condition may be communicated to the ADSH server engine 116. In step 214, the ADSH server engine 116 may examine any one or more of the support application set 124, resource support set 126, service log 136, knowledge base 114, vendor base set 112 or other databases or resources to determine if a matching solution to the fault or condition is found.

If no matching solution is found, processing may proceed to step 216, where a user notification, for instance by dialog box or otherwise, may inform the user that an automated solution has been attempted but not found. In embodiments, the user may subsequently be presented with further options, such as an option to try an automated repair again later, an option to select a manual repair, or others. After the notification of step 216, processing may proceed to step 230 and end, repeat, return to another processing step or perform other action.

If a matching solution to the pending fault or condition is found in step 214, processing may proceed to step 218 where a solution may be communicated to client 102. In step 220, the user may be presented with a dialog box or other notification that a solution is available. In step 222, the user may be presented with options to execute the solution, such as for instance to perform an automatic install, defer installation, revert to manual installation or other alternatives. In step 224, the solution may be executed on client 102. In step 226, the ADSH client 104 may reboot the client 102, restart an application or take other steps to complete the solution. In step 228, the ADSH client 104 may determine whether proper execution of the solution has occurred. If continued or additional faults occur, in step 230 processing may return to step 212. If the fault or other condition has been resolved, processing may proceed to step 232 where processing may end, return to another step, repeat or perform other action.

In embodiments, the application, driver or other update, patch or other resource generated in the solution may be communicated directly from knowledge base 114 or vendor base set 112 to client 102, or may be communicated from ADSH server engine 116 itself or otherwise to the client 102. The client 102 may present an ADSH client 104 to a user to manipulate the receipt and other operation of diagnostic and healing activity on client 102. For instance, the ADSH client 104 may inform a user, via a popup dialog box or otherwise, that a printer or other error has been detected and a driver or patch has been automatically retrieved to attempt to resolve the fault. In embodiments, the ADSH client 104 may permit the user to select between accepting the fix, storing but not implementing the fix, ignoring the fix, or taking other actions. The ADSH client 104 may communicate the user's selected solution back to the ADSH server engine 116, for instance to log the corrective actions to a user profile for future access or correction. ADSH client 104 may in embodiments be interoperable with other software, for instance via application programming interfaces (APIs) or other techniques.

Figure 3:
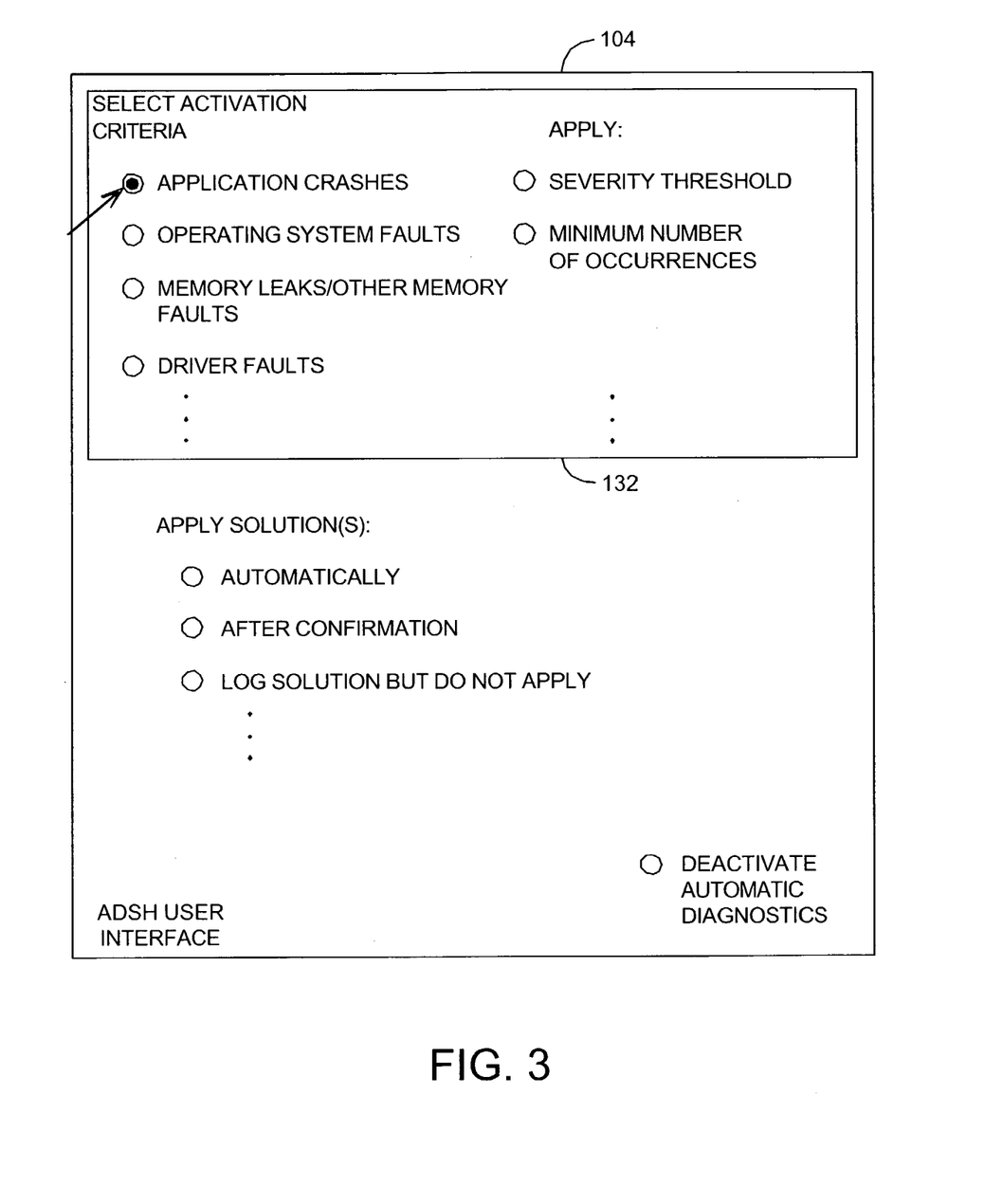
FIG. 3 illustrates a client interface for diagnostic management, according to an embodiment of the invention.

ADSH client 104 may likewise present a user of client 102 with options to configure and maintain the diagnostic and self-healing service operating on that machine. As illustrated in FIG. 3, for instance, a user may program or select a set of activation criteria 132 which govern the activation of fault reporting and other functions of ADSH server engine 116, according to user preference. For instance, the activation criteria 132 may include a threshold filter for certain types of faults or errors, which inhibit the ADSH server engine 116 until selected conditions are met. For example, a user may program the activation criteria 132 to require that memory leak or other memory-related errors reach a certain size, before triggering an attempt at automatic diagnosis. Or, memory type errors could be ignored entirely. For further example, a user might require that an error, such as an application fault, occur a specified number of times before invoking ADSH server engine 116. Other conditions, triggering events, error severity or criteria may be selected as part of activation criteria 132.

In embodiments, besides servicing individual requests for diagnostic and healing on client 102 or other devices, the support server 122 may also track and analyze historical sets of repair actions to develop statistical profiles of application, system resource and other behavior. In this regard, support server 122 may contain an analytic engine 134 communicating with service log 136, service log 136 recording actions taken by ADSH server engine 116 for one, many or all users of client 102 and other clients registered to ADSH server engine 116. This may permit, for example, ADSH server engine 116 to detect recurring faults or patterns to enable better repair or preventive actions.

Figure 4:
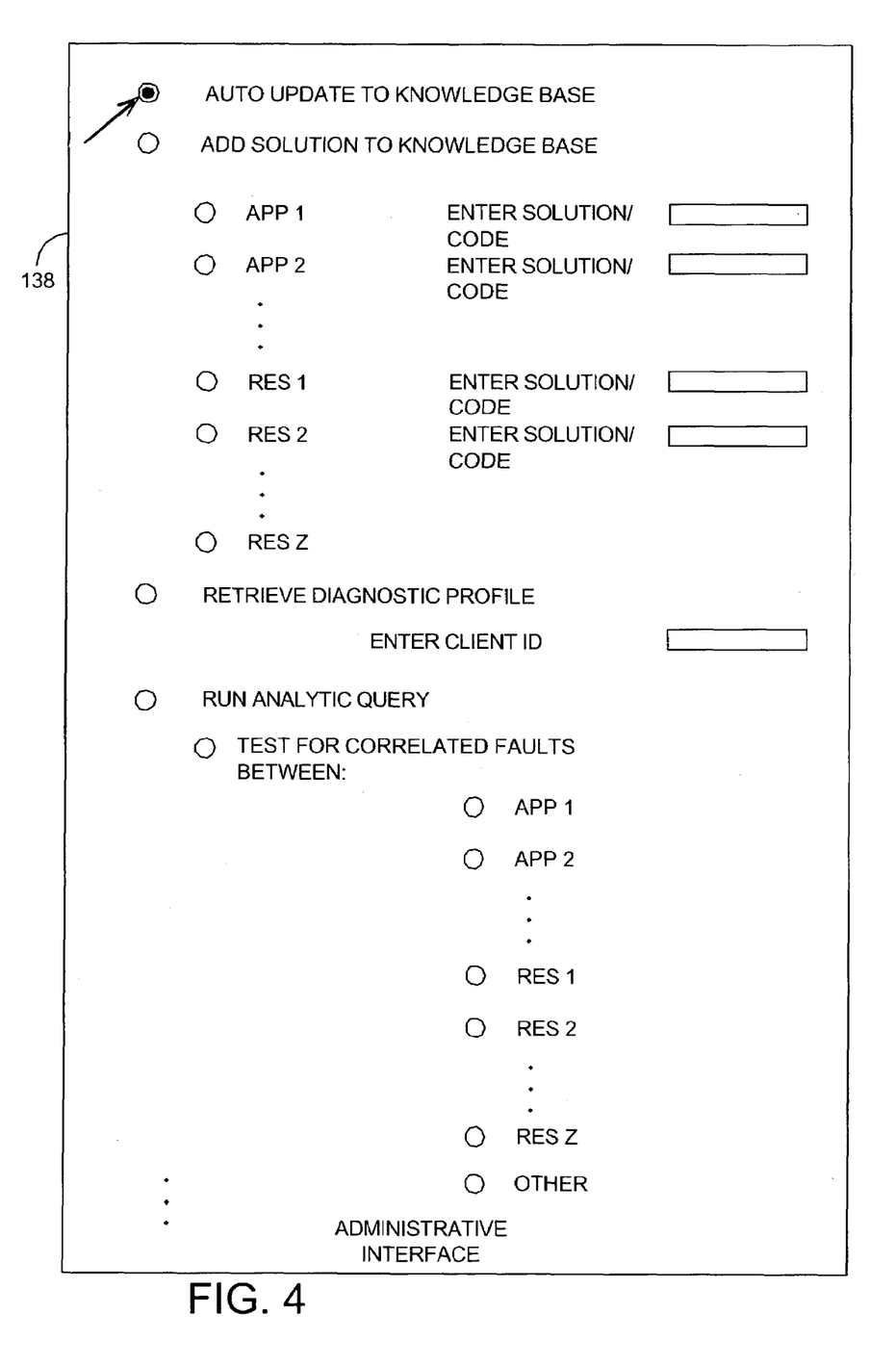
FIG. 4 illustrates an administrative interface for diagnostic service management, according to an embodiment of the invention.

For example, service log 136 may indicate that frequent instances of an application failure for a certain application, such as a graphics package, occur when a given video adapter is installed in a client machine. The ADSH server engine 116 may then determine whether an updated set of system resources 126, such as a video driver, or an available update in application set 124, such as a patch for that application, are available to remedy the problem. If so, then ADSH server engine 116 may add those or other fixes to knowledge base 114, or take other action. As illustrated in FIG. 4, in embodiments, systems administrators may also edit knowledge base 114 using an administrative interface 138, for example to add or modify the knowledge base 114 with updated applications, drivers, error conditions and other data. The administrative interface 138 may in embodiments permit a systems administrator or other user to query the service log 136, knowledge base, vendor base set 112, client 102 and other resources or components to operate and maintain the ADSH server engine 116.

In embodiments, ADSH server engine 116 may proactively deliver or "push" the graphic package, driver or other generated fixes to client 102 or other client devices having the identified combination of problem hardware and software, to prevent compatibility problems from developing. In embodiments, if such a proactive delivery is scheduled, the ADSH client 104 may query the user whether they wish to accept automated downloads on that basis, or defer the download, decline the fix or take other action.

The foregoing description of the invention is illustrative, and modifications in configuration and implementation will occur to persons skilled in the art. For instance, while the invention has generally been described in terms of a standalone client 102 whose installed applications and resources are registered to and maintained by ADSH server engine 116, in embodiments more than one machine, or a local area or other networked group of machines, may be individually or collectively registered to the ADSH server engine 116 and controlled through client 102 or another central administrative machine, or by one ore more other clients or channels.

Similarly, while the knowledge base 114 has generally been described in terms of a single database resource, in embodiments the application, system and other resources described as being stored on knowledge base 114 may be distributed across one or more local or remote databases. Other hardware, software or other resources described as singular may in embodiments be distributed, and similarly in embodiments resources described as distributed may be combined. The scope of the invention is accordingly intended to be limited only by the following claims.

I claim:

1. A system for actively correcting software conditions, comprising:
   a network interface to a client;
   a user interface configured to receive one or more user inputs selecting one or more conditions to serve as activation criteria for use in initiating a network connection to a remote diagnostic service, wherein said one or more conditions indicate one or more problems occurring during execution of one or more programs residing on the client;
   at least one application configured to monitor non-diagnostic execution of said one or more programs residing on said client so as to identify an occurrence of at least one of said one or more conditions indicating a problem occurring during said execution, wherein said at least one application is further configured to establish said network connection between said client and said remote diagnostic service in response to identification of said occurrence, wherein said at least one application is further configured to record a state of the client after said occurrence is identified;
   at least one client system resource;
   a storage, the storage storing diagnostic data comprising at least-an application support set, and
   a client resource support set;
   a processor, in communication with the network interface and the storage, the processor configured to receive said state of the client, and to identify at least one solution based on the state of the client and the diagnostic data.

2. A system according to claim 1, wherein the state of the client comprises a software fault.

3. A system according to claim 1, wherein the state of the client comprises at least one of an out of date application or out of date resource.

4. A system according to claim 1, wherein the processor communicates the at least one solution to the client via the network interface.

5. A system according to claim 1, wherein the network interface comprises at least one of a local area network and the Internet.

6. A system according to claim 1, wherein the processor identifies the at least one solution by comparing the state of the client to at least one of
   at least one knowledge base, and
   at least one vendor base set.

7. A system according to claim 6, wherein the at least one knowledge base comprises at leas one remote knowledge database.

8. A system according to claim 6, wherein the at least one vendor base set comprises at least one remote vendor database.

9. A system according to claim 1, further comprising a diagnostic user interface executing on the client.

10. A system according to claim 9, wherein the diagnostic user interface comprises activation criteria, the at least one solution being generated based upon the activation criteria.

11. A system according to claim 10, wherein the activation criteria comprise at least one of memory error data, error severity data, and error repetition data.

12. A system according to claim 1, wherein the state of the client is generated by an operating system executing on the client.

13. A system according to claim 12, wherein the operating system generates the state of the client only upon detection of a fault.

14. A system according to claim 12, wherein the operating system generates the state of the client based upon a periodic interval.

15. A method for actively correcting software conditions, comprising:
   providing a user interface configured to receive one or more user inputs selecting one or more conditions to serve as activation criteria for use in initiating a network connection to a remote diagnostic service, wherein said one or more conditions indicate one or more problems occurring during execution of one or more programs residing on a client;
   providing at least one application configured to monitor non-diagnostic execution of said one or more programs residing on the client so as to identify an occurrence of at least one of said one or more conditions indicating a problem occurring during said execution, wherein said at least one application is further configured to establish said network connection between said client and said remote diagnostic service in response to identification of said occurrence, wherein said at least one application is further configured to record a state of the client after said occurrence is identified;
   receiving at said remote diagnostic service said state of said client via said network connection;
   comparing the state of the client to diagnostic data, the diagnostic data comprising at least;
   an application support set, and
   a client resource support set; and
   identifying at least one solution based on the state of the client and diagnostic data.

16. A method according to claim 15, wherein the state of the client comprises a software fault.

17. A method according to claim 15, wherein the state of the client comprises at least one of an out of date application or out of date resource.

18. A method according to claim 15, further comprising a step of communicating the at least one solution to the client via the network connection.

19. A method according to claim 15, wherein the network connection comprises at least one of a local area network and the Internet.

20. A method according to claim 15, wherein the step of identifying comprises a step of comparing the state of the client to at least one of
   at least one knowledge base, and
   at least one vendor base set.

21. A method according to claim 20, wherein the at least one knowledge base comprises at leas one remote knowledge database.

22. A method according to claim 20, wherein the at least one vendor base set comprises at least one remote vendor database.

23. A method according to claim 15, further comprising a step of executing a diagnostic user interface on the client.

24. A method according to claim 23, wherein the diagnostic user interface comprises activation criteria, further comprising a step of identifying the at least one solution based upon the activation criteria.

25. A method according to claim 24, wherein the activation criteria comprise at least one of memory error data, error severity data, and error repetition data.

26. A method according to claim 15, further comprising a step of generating the state of the client via an operating system executing on the client.

27. A method according to claim 26, wherein the operating system generates the state of the client only upon detection of a fault.

28. A method according to claim 26, wherein the operating system generates the state of the client based upon a periodic interval.

29. A system for actively correcting software conditions, comprising:
   network interface means, the network interface means for interfacing to a client;
   a user interface configured to receive one or more user inputs selecting one or more conditions to serve as activation criteria for use in initiating via said network interface means a network connection to a remote diagnostic service, wherein said one or more conditions indicate one or more problems occurring during execution of one or more programs residing on a client;
   at least one application configured to monitor non-diagnostic execution of said one or more programs residing on said client so as to identify an occurrence of at least one of said one or more conditions indicating a problem occurring during said execution, wherein said at least one application is further configured to establish said network connection between said client and said remote diagnostic service in response to the identification of said occurrence, wherein said at least one application is further configured to record a state of the client after said occurrence is identified;
   at least one client system resource;
   storage means, the storage storing diagnostic data comprising at least an application support set, and
   a client resource support set;
   processing means, in communication with the network interface and the storage, the processing means configured to receive said state of the client, and to identify at least one solution based on the state of the client and the diagnostic data.

30. A system according to claim 29, wherein the state of the client comprises a software fault.

31. A system according to claim 29, wherein the state of the client comprises at least one of an out of date application or out of date resource.

32. A system according to claim 29, further comprising diagnostic user interface means, the diagnostic user interface means executing on the client to manage the active correction performed on the client.

33. A system according to claim 32, wherein the diagnostic user interface means comprise activation criteria, the at least one solution being generated based upon the activation criteria.

34. A system according to claim 29, wherein the state of the client is generated by operating system means executing on the client.

35. A system according to claim 34, wherein the operating system means generate the state of the client only upon detection of a fault.

36. A system according to claim 34, wherein the operating system means generate the state of the client based upon a periodic interval.

37. A computer readable medium, the computer readable medium being readable to execute a method for actively correcting software conditions, the method comprising:
   providing a user interface configured to receive one or more user inputs selecting one or more conditions to serve as activation criteria for use in initiating a network connection to a remote diagnostic service, wherein said one or more conditions indicate one or more problems occurring during execution of one or more programs residing on a client;
   providing at least one application configured to monitor non-diagnostic execution of said one or more programs residing on the client so as to identify an occurrence of at least one of said one or more conditions indicating a problem occurring during said execution, wherein said at least one application is further configured to establish said network connection between said client and said remote diagnostic service in response to identification of said occurrence, wherein said at least one application is further configured to record a state of the client after said occurrence is identified;
   receiving at said remote diagnostic service said state of said client via said network connection;
   comparing the state of the client to diagnostic data, the diagnostic data comprising at least
   an application support set, and
   a client resource support set; and
   identifying at least one solution based on the state of the client and diagnostic data.

38. A computer readable medium according to claim 37, wherein the state of the client comprises a software fault.

39. A computer readable medium according to claim 37, wherein the state of the client comprises at least one of an out of date application or out of date resource.

40. A computer readable medium according to claim 37, the computer readable medium being programmed to execute a further step of executing a diagnostic user interface on the client to manage the active correction performed on the client.

41. A computer readable medium according to claim 40, wherein the diagnostic user interface means comprise activation criteria, the at least one solution being generated based upon the activation criteria.

42. A computer readable medium according to claim 37, wherein the state of the client is generated by an operating system executing on the client.

43. A computer readable medium according to claim 42, wherein the operating system generates the state of the client only upon detection of a fault.

44. A system according to claim 42, wherein the operating system generates the state of the client based upon a periodic interval.

45. A system for actively correcting software conditions, comprising:
   a first user interface configured to receive one or more user inputs selecting one or more conditions to serve as activation criteria for use in initiating a network connection to a remote diagnostic service, wherein said one or more conditions indicate one or more problems occurring during execution of one or more programs residing on a client;
   at least one application configured to monitor non-diagnostic execution of said one or more programs residing on said client so as to identify an occurrence of at least one of said one or more conditions indicating a problem occurring during said execution, wherein said at least one application is further configured to establish said network connection between said client and said remote diagnostic service in response to the identification of said occurrence, wherein said at least one application is further configured to record a state of the client after said occurrence is identified;
   a second interface to an operating system executing on the client;
   a third interface to a network; and
   a processor, in communication with the first user interface, the second interface and the third interface, the processor is configured to receive the state of the client via said network connection, wherein said processor is further configured to communicate said state of the client to a support server via the second interface.

46. The system according to claim 45, wherein the first user interface comprises selectable activation criteria.

47. The system according to claim 45, wherein the at least one condition comprises a software fault.

48. The system according to claim 45, wherein the at least one condition comprises a periodic interval.

49. The system according to claim 45, wherein the third interface comprises at least one of a local area network and the Internet.

50. The system according to claim 45, wherein the processor receives a solution from the support server via the third interface.

51. A method for actively correcting software conditions, comprising:
   receiving one or more user inputs selecting one or more conditions to serve as activation criteria for use in initiating a network connection to a remote diagnostic service, wherein said one or more conditions indicate one or more problems occurring during execution of one or more programs residing on a client;
   monitoring non-diagnostic execution of said one or more programs residing on the client;
   identifying an occurrence of at least one of said one or more conditions indicating a problem occurring during said execution;
   establishing said network connection between said client and said remote diagnostic service in response to identification of said occurrence;
   recording a state of the client after said occurrence is identified; and
   communicating the state of the client system to said remote diagnostic service via said network connection.

52. The method according to claim 51, wherein said monitoring is performed by an operating system executing on the client system.

53. The method according to claim 51, wherein the at least one condition comprises a software fault.

54. The method according to claim 51, wherein the at least one condition comprises a periodic interval.

55. The method according to claim 51, wherein the communicating comprises a step of communicating via at least one of a local area network and the Internet.

56. The method according to claim 51, further comprising a step of receiving a solution from a support server.

57. A computer readable medium, the computer readable medium being readable to execute a method for actively correcting software conditions, the method comprising:

receiving one or more user inputs selecting one or more conditions to serve as activation criteria for use in initiating a network connection to a remote diagnostic service, wherein said one or more conditions indicate one or more problems occurring during execution of one or more programs residing on a client;

monitoring non-diagnostic execution of said one or more programs residing on the client;

identifying an occurrence of at least one of said one or more conditions indicating a problem occurring during said execution;

establishing said network connection between said client and said remote diagnostic service in response to identification of said occurrence;

recording a state of the client after said occurrence is identified; and communicating the state of the client system to said remote diagnostic service via said network connection.

58. The computer readable medium according to claim 57, wherein the diagnostic service comprises selectable activation criteria.

59. The computer readable medium according to claim 57, wherein the at least one condition comprises a software fault.

60. The computer readable medium according to claim 57, wherein the at least one condition comprises a periodic interval.

61. The computer readable medium according to claim 57, wherein the communicating comprises a step of communicating via at least one of a local area network and the Internet.

62. The computer readable medium according to claim 57, further comprising a step of receiving a solution from a support server.

* * * * *